United States Patent [19]

Olsen

[11] 3,890,994

[45] June 24, 1975

[54] NORMALLY OPEN VALVE CONSTRUCTION HAVING A DEFORMABLE BLADDER

[76] Inventor: Charles R. Olsen, Box 851, West Chester, Pa. 19355

[22] Filed: Aug. 20, 1973

[21] Appl. No.: 390,075

[52] U.S. Cl. ............... 137/67; 138/93; 251/61.1; 251/331
[51] Int. Cl. ....... F16k 7/02; F16k 7/10; F16l 55/12
[58] Field of Search ............ 137/67; 138/93, 94; 251/61.1, 190, 191, 331

[56] References Cited
UNITED STATES PATENTS

| | | | |
|---|---|---|---|
| 587,102 | 7/1897 | Meany | 138/93 |
| 3,086,540 | 4/1963 | Anderson | 138/93 X |
| 3,422,832 | 1/1969 | Moulton | 137/67 |
| 3,491,798 | 1/1970 | Beshara | 138/93 X |

FOREIGN PATENTS OR APPLICATIONS

| | | | |
|---|---|---|---|
| 903,769 | 2/1954 | Germany | 251/331 |
| 1,256,003 | 2/1961 | France | 251/61.1 |

Primary Examiner—Martin P. Schwadron
Assistant Examiner—Richard Gerard
Attorney, Agent, or Firm—McCormick, Paulding & Huber

[57] ABSTRACT

A valve construction includes a housing defining a fluid passageway between at least two ports on the exterior of the housing. A deformable metallic bladder is mounted in the housing with a crushed portion folded in a flattened condition projecting into the fluid passageway in a manner permitting fluid flow between the ports with minimum resistance. To cut off flow, the bladder is pressurized and the crushed portion unfolds from the flattened condition and thus fills the passageway to completely obstruct flow. A piston may be driven through the crushed bladder to completely straighten its walls and to hold the walls in sealing relationship with the passageway.

17 Claims, 9 Drawing Figures

NORMALLY OPEN VALVE CONSTRUCTION HAVING A DEFORMABLE BLADDER

BACKGROUND OF THE INVENTION

The present invention relates to a valve construction which is intended for a one-time operation and, more particularly, is concerned with a normally open valve having a crushed metallic bladder which is expanded in a passageway to cut off fluid flow.

Many normally open valves of the prior art have been built with rotating or sliding seals in the form of O-rings or packing glands which limit leakage before and after the valve is operated. The use of seals has several serious disadvantages. Seals increase the forces required to actuate the valves. If a pyrotechnic device is utilized to generate the required actuating forces, special precautions must be taken to prevent hot operating gases from coming into contact with the seals. Since such gases are at high pressures there is also the danger of having the gases and other products of combustion blow by the seals into the passageways carrying fluid controlled by the valve. In addition, seals tend to deteriorate over long periods of time, particularly if the valve is not actuate periodically. The reliability of the seals, particularly the long term reliability, is questionable and frequently minor amounts of leakage past the seals are more than can be tolerated in critical systems such as those found in missiles or spacecraft where success or failure hinges upon the combined operation of many systems and sub-systems.

Some valve constructions of the prior art which are suitable for a one-time operation have employed pyrotechnic devices to generate the necessary gas pressure for operating the valve. Pyrotechnic devices are quite suitable for one-time operations in missile systems and the like because they are reliable even after long storage periods and can be remotely activated by means of an electrical igniting squib. One explosively actuated valve of the prior is shown in U.S. Pat. No. 3,422,832 to J. I. Moulton. In this prior art valve, all of the products of combustion from an electrically actuated squib are directed against a piston enclosed within a sealed, deformable sleeve or bladder. While such construction is most advantageous insofar as the contamination problem is concerned, the particular construction illustrated in the referenced patent includes a bladder which occupies is substantial portion of the fluid passageway which is normally open for the fluid flow between two ports in the housing of the valve. The problem of providing a valve which close normally open and without large internal fluid impediments has not previously been considered to Applicant's knowledge and the solution to the problem is one of the principal features of an Applicant's valve described hereinafter.

It is, accordingly, a general object of the present invention to disclose a valve construction having no rotating or sliding seals and which may be operated by a pyrotechnic device or equivalent high pressure actuating source without having high-pressure gases which operate the valve enter the fluid system being controlled by the valve.

It is also a further object to the present invention to disclose a valve construction which in a normally open condition presents a low-flow restriction to a controlled fluid and which can be operated to a closed position on command.

One further difficulty that exists with pyrotechnically operated valves of the prior art is that operation of the valves between the fully open and fully closed position occurs in a relatively brief period of time due to the manner in which actuating gases are generated. Sudden operation of the valves can produce a "hammer" effect in the controlled fluid system due to shock waves produced by the sudden closing of a valve. It is, accordingly, an object of the invention to disclose a valve in which the operation is prolonged so that transient effects are spread out over a longer period of time with correspondingly attenuated intensities.

SUMMARY OF THE INVENTION

The present invention resides in a valve construction having a normally open position in a fluid system. The valve includes a housing defining first and second ports and a fluid passageway extending between the ports. A deformable metallic bladder is mounted in the housing and projects into the fluid passageway between the ports. The bladder has an elongated tubular configuration which is closed at one end, open at the opposite end and crushed to a flat configuration in the portion projecting in the passageway. The bladder in the uncrushed condition defines a cross-section substantially equal to the cross-section of the fluid passageway at the station where the bladder projects into the passageway. In the crushed condition, the tube wall is collapsed upon itself and is located in the fluid passageway in the housing so that a fluid can readily flow by the collapsed tube wall. When the valve is actuated, the bladder is pressurized internally so that the collapsed wall expands outwardly against the passageway and obstructs flow between the ports.

In the preferred form, the bladder is crushed at the one end into a flattened condition which can be aligned with the fluid flow through the passageway of the housing and provide minimum flow restriction. In the flattened condition, the tubular wall of the bladder forms a series of convolutions which are readily unfolded to a configuration corresponding to that of the passageway and thereby obstructs fluid flow.

DESCRIPTION OF THE PREFERRED EMBODIMENTS

Figure 1:
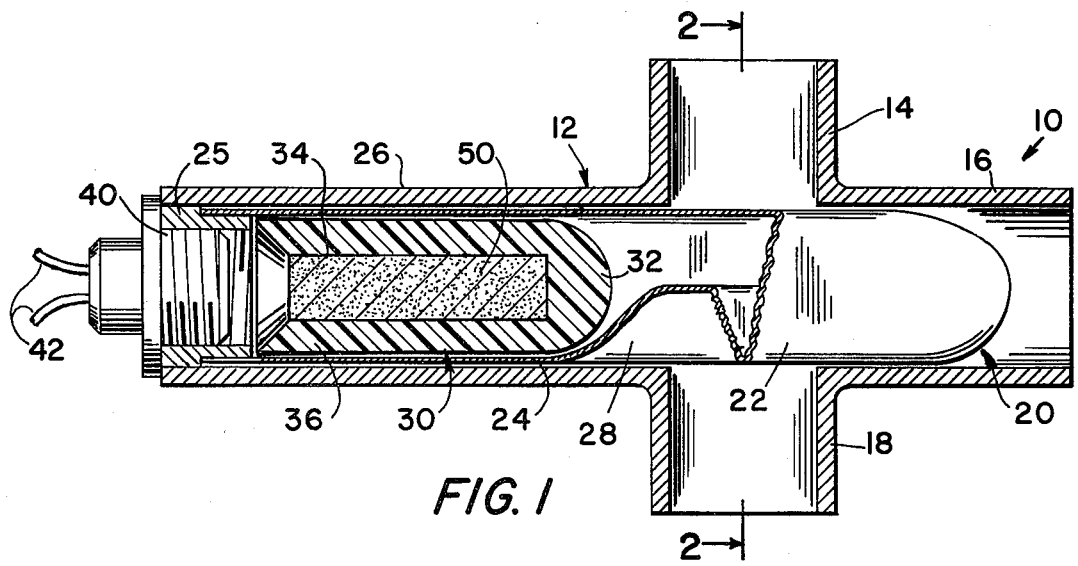
FIG. 1 is a cross-sectional view showing one embodiment of my normally open valve construction prior to actuation.
Figure 2:
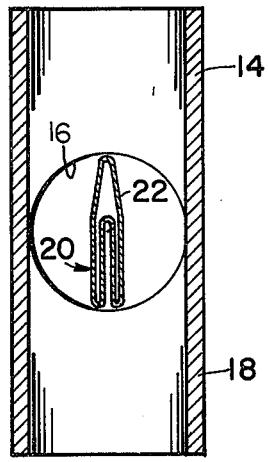
FIG. 2 is a sectional view of the valve construction in FIG. 1 as seen along the sectioning line 2—2.
Figure 3:
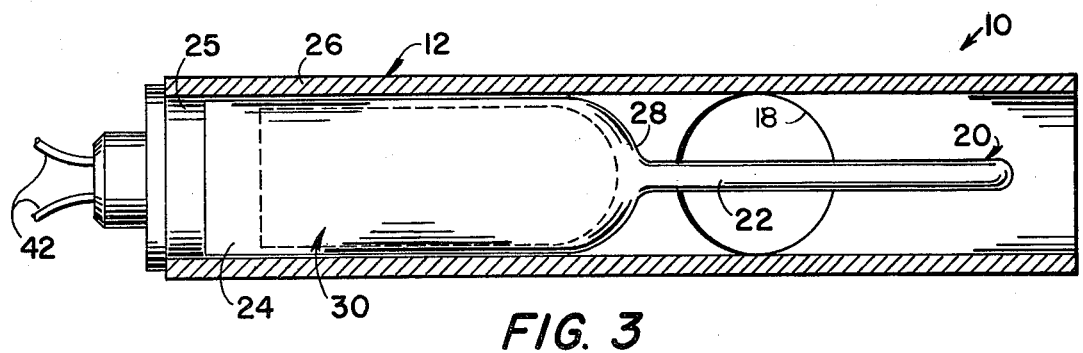
FIG. 3 is a partially sectioned top plan view of the valve construction in FIG. 1 prior to actuation.

FIGS. 1–3 illustrate one embodiment of my normally open valve prior to actuation. The valve, generally designated 10, includes a housing 12 having a plurality of intersecting cylindrical ducts 14, 16 and 18 defining fluid passageways within the housing. Each of the ducts has circular openings defining ports which can be connected to a fluid system to be controlled by the valve. The number of ducts and ports may be reduced or increased as long as a continuous flow path through the valve is provided. Furthermore, the directions of fluid flow through the ducts are not important and can be varied without adversely affecting the valve performance.

The valve 10 also includes a deformable metallic bladder 20 which has one end portion 22 projecting transversely of the ducts 14 and 18 into the intersection of the passageways formed by the three ducts, 14, 16 and 18. The opposite end portion 24 of the bladder 20 has substantially the same cross-section as the interior of the cylindrical extension 26 of the housing 12. The bladder 20 is welded or otherwise connected in sealing relationship to a short sleeve 25 and the sleeve in turn is welded or otherwise sealingly connected to the cylindrical extension 26 of the housing 12 so that fluid passing through the ducts 14, 16 and 18 is not permitted to leak from the housing 12 at the end of the cylindrical extension 26 where the bladder is mounted.

The bladder 20 is formed from a ductile metal so that the one end portion 22 of the bladder projecting into the intersection of the ducts 14, 16 and 18 can be crushed into a flattened, planar condition with the general plane of the portion 22 aligned with the fluid flow paths in the ducts for minimum flow restriction between any two ducts as shown most clearly in the sectional view of FIG. 2 and the top plan view of FIG. 3. The flattened end portion 22 is closed so that fluid passing through the valve 10 does not enter the interior of the bladder 20 and gases or other fluids within the bladder do not escape into the fluid system controlled by the valve.

The configuration of the bladder 20 in the crushed condition is perhaps better understood by the manner in which the bladder is formed. Initially, the bladder is a cylindrical tube which has been stretch-formed with the one end portion 22 closed. Of course, an open ended tube can also be closed by welding, crimping or other sealing process. If flow through conduit 16 is not important, an open-ended tube closed by means of a sealing plug welded in the end of the tube can be used. At least one longitudinal indentation is then formed in the wall of the tube along the portion 22. The indentation extends along the tube toward the closed end preferably from a point which will be located within the cylindrical extension 26 of the housing 12. If the tube is closed by a sealing plug at the end portion 22, the indentation extends at least along the portion of the tube which passes through the intersection of the ducts 14, 16 and 18. With a stretch-formed tube such as shown in the drawings, the indentation can extend completely to the closed end.

The indented portion of the tube is then crushed in a flattened configuration so that the wall of the tube is collapsed upon itself and forms a series of convolutions as illustrated most clearly in FIG. 2. A transition section 28 is formed between the flattened portion 22 adjacent the closed end and the cylindrical portion 24 adjacent the opposite end of the tube. The tube is then attached to the sleeve 25 by welding or other suitable sealing process.

In one form, the bladder 20 is constructed from a ductile steel stretch-formed in the closed tubular configuration having a tube wall of approximately 0.030 of an inch. The longitudinal indentation is then formed in the closed end of the tube by a forming die and the tube wall is collapsed to the flattened configuration by a press. Of course, the wall thickness of the tube can be varied depending upon the size of the overall valve and the specific rate and mode of operation expected of the valve.

In the present embodiment of the valve 10 a forming punch or piston 30 is mounted in the cylindrical end portion 24 of the bladder 20. The piston 30 has a smoothly curved head 32 at one end and an axially extending bore 34 opening rearwardly at the skirt 36 of the piston opposite the head 32. The piston fits snugly within the cylindrical section of the bladder 20 and is preferably tapered toward the head 32 so that the skirt 36 of the piston is slightly larger in diameter than the head and fits within the bladder 20 in sealing relationship. With the piston shaped in this manner high-pressure gases operating upon the skirt of the piston will not blow by the piston into the closed end of the bladder 20 and the shaped head will be moved into the flattened portion 22 of the bladder 20 to deform and unfold the convolutions as defined in greater detail below.

Threadably mounted within the sleeve 25 at the end of the elongated extension 26 is an electrically actuated squib 40 which can generate high pressure gases that operate against the adjacent skirt 36 of the piston 30 to drive the piston through the deformable bladder 20. To operate the squib 40, a pair of electrical leads 42 are connected to a suitable electrical power source and when the valve 10 is to be closed, a low voltage from the source passes through the leads to ignite an explosive charge within the squip 40. The pressurized gases formed during the explosion are prevented from leaking past the skirt section 36 of the piston 30 by the tight fit between the skirt section and the bladder 20. As a result, none of the gases are permitted to escape into the interior portion of the bladder in front of the piston head 32 which would cause an uncontrolled unfolding of the bladder and sudden closure of the valve 10. Instead, the entire energy of the high pressure gases operates upon the piston and moves the piston 30 through the bladder to progressively and uniformly unfold the bladder.

Figure 4:
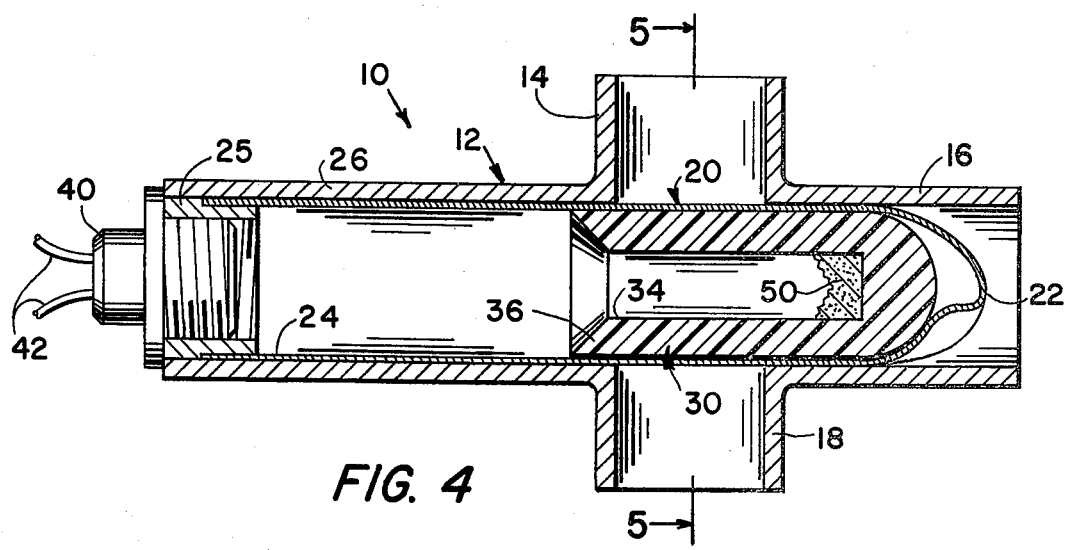
FIG. 4 is a sectional view of the valve construction in FIG. 1 after actuation.
Figure 5:
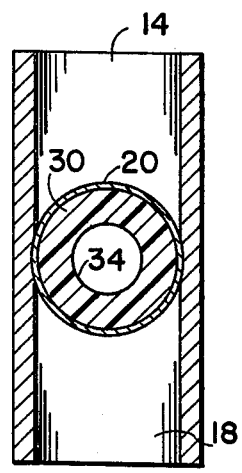
FIG. 5 is a sectional view of the valve construction in FIG. 4 as seen along the sectioning line 5—5.

As the piston 30 moves through the bladder 20, it reaches the intersection of the ducts 14, 16 and 18 as shown in FIGS. 4 and 5. Preferably, the passageway in the housing 12 between the elongated section 26 and the duct 16 is tapered inwardly by the same amount as the piston so that the passageway in duct 16 is slightly smaller in cross-section than the piston and bladder in combination. The movement of the piston 30 is then halted in the intersection of ducts 14, 16 and 18 and the bladder 20 is pressed in sealing relationship against the walls of each duct to completely cut off fluid communication between any of the ducts. In the preferred form of the invention, the total volume of evolved gas propelling the piston through the bladder should be measured to produce a slightly positive pressure on the skirt section 36 of the piston 30 after piston motion has been arrested at the intersection to insure that the bladder 20 seals the passageways in the housing 12 and the valve remains closed.

Although the electrical squib 40 may produce all of the gas needed to displace the piston 30, the rate at which gas evolves from conventional squibs in explosively actuated valves of the prior art is very high, that is, in a fraction of a second. To allow the piston 30 to be propelled through the bladder and to close the valve 10 in such a brief period of time can cause damage to the fluid system in which the valve is connected due to shock waves propagated through the system from the valve. Therefore, a means for reducing the function time between actuation and full closure is provided.

To reduce the rate at which the valve operates, the pyrotechnic squib 40 is provided with a very small charge of detonating material which rapidly produces a quantity of gas inadequate to completely displace the piston to its closed position illustrated in FIGS. 4 and 5. However, the charge is adequate to ignite an inhibited propellant 50 provided in the bore 34 of the piston 30 and the continued gas generation at a reduced rate by the propellant 50 displaces the piston to the closed position at a correspondingly reduced rate. The rate of gas generation from the propellant 50 is limited by the size of the sustainer grain in the propellant and the end-burning effect of the propellant within the bore 34. The end-burning effect, of course, limits the surface area of the burning grain and, correspondingly, the overall burn time for the propellant. By adjusting the relative proportions of the detonating material in the squib 40 and the inhibited propellant 50 in the piston, the function time of the valve can be varied from a fraction of a second when all of the energy is provided by the detonating material up to 15 seconds or more where most of the gases are generated by the propellant 50.

It will be further understood that the desired function time, that is the time between energization of the squib and full closure of the valve, is determined by the requirements of the fluid system controlled by the valve 10. The extended function times are established by selecting the rate at which actuating gas is generated in accordance with the rate at which energy must be produced to completely expand or unfold the metallic bladder 20 with the piston 30 in the desired period. The quantity of detonating material or inhibited propellant provided is preferably slightly greater than the quantity needed to displace the piston to the intersection of the ducts 14, 16 and 18 as mentioned above so that a positive pressure will remain on the piston after it closes the valve.

The piston 30 may be a formed metallic member but since the skirt 36 of the piston prevents heat from the squib 40 or propellant 50 from reaching the head 32, it may also be formed of a plastic material in certain embodiments of the valve in which the energy required to unfold the bladder 20 does not deform the plastic material. Of course, the head 32 is sized and shaped to unfold the bladder with minimum energy losses due to friction and stretching of the bladder walls. A tapered or rounded head such as illustrated is desirable for this reason.

Figure 6:
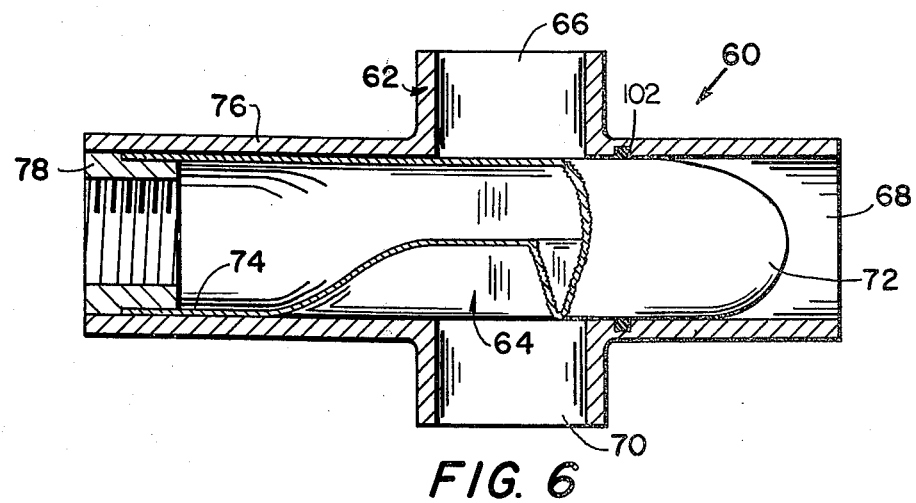
FIG. 6 is a cross-sectional view of another embodiment of the valve construction before actuation.
Figure 7:
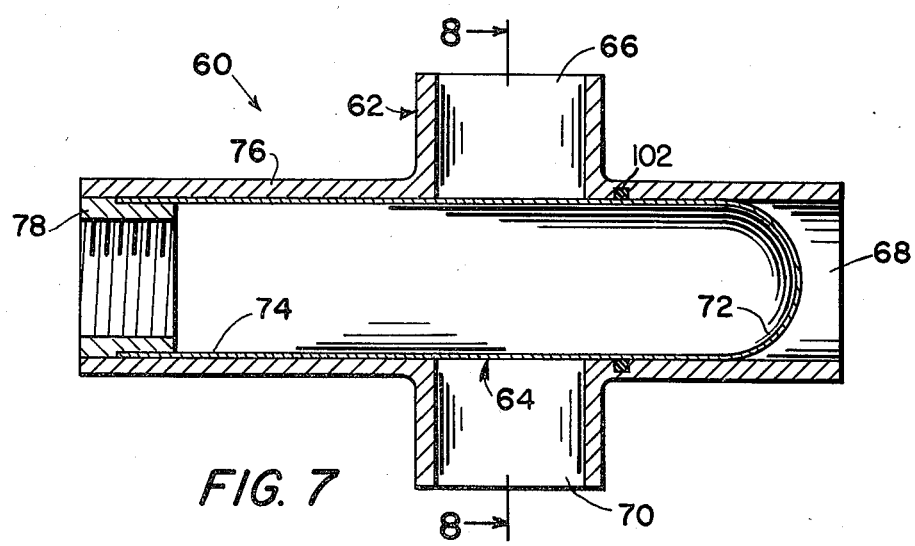
FIG. 7 is a sectional view of a valve construction in FIG. 6 after actuation.
Figure 8:
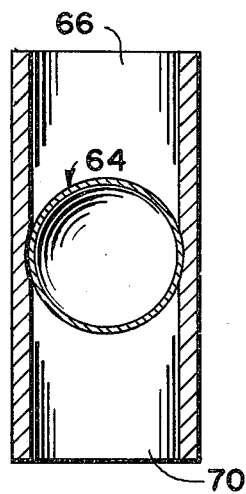
FIG. 8 is a cross-sectional view of the valve construction in FIG. 7 as seen along the lines 8—8.

Another embodiment of my valve is illustrated in FIGS. 6-8. The valve, generally designated 60, is constructed in the same basic fashion as the valve 10 without a piston and includes a housing 62 and a deformable metallic bladder 64 projecting into the intersection of ducts 66, 68 and 70 formed by the housing. The bladder 64 extends generally transversally of the ducts 66 and 70 and is crushed into a flattened condition at one end 72 in the same manner as the bladder 20 in FIG. 1. Accordingly, the bladder 64 initially has a tubular configuration with one end 72 of the tube closed and flattened to form a series of adjacent convolutions illustrated in the bladder 20 in FIG. 2. The bladder 64 is positioned within the ducts 60, 68 and 70 so that fluid flow may take place along the path between any two of the ducts. In the crushed condition, the closed end 72 of the bladder 64 is generally aligned with the path of fluid flow within the ducts of the housing 62 so that minimum flow resistance is generated by the bladder in the fluid system being controlled by the valve 60.

The end 74 of the bladder 64 opposite the closed end has a cylindrical configuration corresponding in cross-section to the extension 76 of the housing 62. The bladder 64 is welded or otherwise sealingly connected to the sleeve 78 having internal threads for connection to a fluid actuator such as the gas generating squib 40 shown in the embodiment of FIG. 1. The sleeve 78 is in turn welded to the extension 76 so that the controlled fluid passing through the ducts 60, 68 and 70 cannot leak around the sleeve 78.

Operation of the valve 60 is achieved by connecting a source of fluid pressure to the sleeve 78 so that the interior of the bladder 64 can be pressurized. On command, actuating fluid is introduced through the sleeve 78 at a pressure which causes the flattened end 72 of the bladder 64 to unfold into sealing relationship with the housing 62 at the intersection of the ducts 66, 68 and 70. A positive seal at the intersection of the ducts is most readily assured by initially forming the bladder 64 from a tube having the same cross-sectional configuration as the ducts at the intersection. When the bladder is subsequently pressurized, the tube walls are deformed outwardly against the housing 62 and a slight additional pressure from the actuating field insures that the tube walls are held in sealing relationship with the housing as illustrated in FIGS. 7 and 8.

Figure 9:
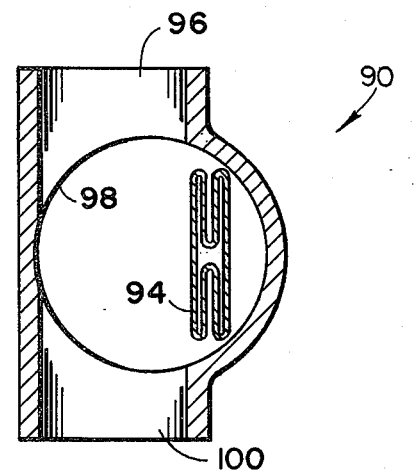
FIG. 9 is a sectional view similar to FIG. 2 and illustrates an alternate embodiment of the valve construction.

FIG. 9 shows in a cross-sectional view similar to FIG. 2 an alternate embodiment of my valve construction, generally designated 90, suitable for use in environments where a clear path is desired through the ducts containing the valve. In this embodiment, the deformable metallic bladder 94, with or without a piston, has its flattened end portion located in offset relationship to the passageways of the intersecting ducts 96, 98 and 100. The duct 98 is also slightly larger in diameter than the ducts 96 and 100 and has its axis offset from the axes of ducts 96 and 100 so that the bladder 94 may be located substantially out of the mainstream of fluid passing between ducts 96 and 100. The bladder 94 when uncrushed or expanded has the same cross-section as the duct 98 and completely fills and obstructs the passageway at the intersection of the ducts.

To reduce the profile of the bladder 94 and to thereby permit the positioning of the bladder 94 in the offset portion of the duct 98 substantially removed from the passageway between ducts 96 and 100, the bladder 94 has been formed with two longitudinal indentations at diametrically opposite sides before it was crushed into the flattened condition illustrated. It will thus be seen that a plurality of convolutions or concertina-type folds are formed in the bladder and the overall dimensions of the flattened section are reduced to allow the placement of the bladder in a small section of the duct 98. It should be understood that the nondeformed or cylindrical section (not shown) of the bladder 94 may remain coaxially positioned with respect to the duct 98, as is the end portion 24 in the embodiment of FIG. 1, since the offsetting and flattening of the illustrated portion of the bladder 94 can be carried out simultaneously following the formation of the longitudinal indentations in the bladder.

The valve construction 90 illustrated in FIG. 9 may have particular utility as a sealing valve in the casing of an oil well drilling rig. The offset relationship of the bladder 94 will permit a drilling shaft to pass through the ducts 96 and 100 without physical interference. When the drilling shaft is removed, the valve may be actuated to expand the bladder 94 across the passageway between the ducts 96 and 100 to seal the casing.

To further assure that a fluid-tight closure of the valve is achieved and maintained between the bladders 20, 64 or 94 illustrated in the above-referenced embodiments, a soft or pliable sealing coating may be sprayed or otherwise applied to the outer surfaces of the bladder which expand into sealing relationship with the housing of the valve. When the bladders have expanded and cutoff flow through the ducts of the valve, the pliable coating assists in maintaining a fluid-tight seal in the presence of fluid pressure in the ducts or slight relaxation of the bladder if internal actuating pressure is lost. Of course, it is not essential that the coating extend over the entire exterior surface of the bladders. A coating over the portion which projects into the ducts to be sealed is adequate.

Alternatively, instead of providing a pliable coating on the exterior of the bladder, a similar coating could be applied to the interior walls of the ducts engaged by the bladders or a localized pliable material other than a coating, such as an O-ring contacted by the bladder, could serve a similar purpose. For example, in the embodiment of the actuator illustrated in FIG. 6 an O-ring 102 circumscribing the bladder 64 and embedded in the walls of the duct 68 provides a fluid seal between the duct 68 and the ducts 66 and 70.

Accordingly, a sealing means such as a pliable coating on either the bladder or the duct walls or an O-ring is desirable in the valve housing to cooperate with the metallic bladder in the uncrushed condition in achieving a fluid-tight closure of the valve.

It will be seen that my novel valve constructions described above employ a bladder which in a flattened configuration enables the valve to exhibit minimum flow resistance to a controlled fluid when the valve is in its normally open condition in the controlled fluid system. Unlike the prior art valves employing an expandible bladder, the controlled fluid flow need not be turned through right angles as it passes through the valve as in the case, for example, of fluid passing between the ports 14 and 18 in FIG. 1 or 66 and 70 in FIG. 6. The valve passageways remain substantially unobstructed. No rotating or sliding seals are employed and if a pyrotechnic charge is utilized to actuate the valve, all of the high-pressure gases which operate the valve remain confined in the closed bladder. The fluid system being controlled by the valve is, accordingly, not contaminated. The rate at which the valve operates when explosively actuated can be regulated to avoid damaging shock waves in the controlled fluid system. Accordingly, my valve constructions offer unique operational features not previously available from valves in prior art.

Although the present invention has been described in several perferred embodiments, substitutions and modifications to the disclosed structure can be had without departing from the spirit of the invention. It will be readily apparent that the piston 30 illustrated in the valve of FIG. 1 can be employed in valve constructions which are actuated by other than explosive means. Liquid or gaseous actuating fluids are capable of either displacing the piston through a deformable bladder or operating directly upon the bladder itself to close the valve. Although each of the valves illustrated in the drawings has three fluid ducts which communicate with one another at a common intersection, the valve could be constructed with any two of the ducts and its operation would not be affected in any manner. Accordingly, the present invention has been described in several preferred embodiments by way of illustration rather than limitation.

I claim:

1. A normally open valve for a fluid system comprising:
   a valve housing defining first and second fluid ports and a fluid passageway extending between the ports;
   a deformable metallic bladder mounted in the valve housing with one portion in a crushed condition projecting into the passageway at a station between the first and second ports, the bladder in the uncrushed condition having an elongated tubular configuration which is closed at one end and forms an opening at the opposite end and having a tube wall defining a tube cross-section completely filling the fluid passageway at said station, and in the crushed condition having the tube wall in the crushed portion substantially collapsed upon itself whereby the fluid passageway is not fully obstructed between the ports and
   means mounted in the opposite end of the metallic bladder for movement through the bladder and for deforming the collapsed tube wall outwardly in the fluid passageway of the valve housing to close the passageway between the ports.

2. A normally open valve as defined in claim 1 wherein the means for deforming comprises a piston having a shaped head facing the closed end of the metallic bladder and a skirt section fitted tightly within the opposite end of the bladder.

3. The valve of claim 2 wherein an inhibited propellant charge is mounted at the skirt section of the piston facing the opposite end of the metallic bladder.

4. A valve construction comprising:
   a housing having at least two ports and an interconnecting passageway defining a fluid flow path between the ports;
   a thin walled tube extending transversely across at least one portion of the passageway in the housing and having the tube wall in the passageway folded upon itself to form a flat tube section in the passageway allowing fluid to pass between the ports, the folded tube wall also having a cross-section when unfolded obstructing said one portion of the passageway between the ports and a piston mounted in a section of the tube displaced from the flat section and being sized and shaped to move into the folded tube section and deform the folded tube wall outwardly into sealing relationship with the passageway.

5. The valve construction of claim 4 wherein the piston fits in sealing relationship in one end of the thin walled tube out of the passageway and wherein an inhibited propellent charge is carried at one side of the piston facing away from the folded tube wall in the passageway.

6. The valve construction of claim 4 further including a gas generator mounted in sealing relationship in one end of the thin walled tube.

7. The valve construction of claim 6 wherein the end of the thin walled tube opposite the end having the gas generator is a closed end.

8. A normally open valve for a fluid system comprising: a valve housing defining first and second fluid ports and a fluid passageway extending between the ports, the housing having another opening at the housing exterior communicating with the passageway at a station between the ports; and a tube-like, deformable, metallic bladder mounted in the opening of the valve housing with a first end portion and an opposite, second end portion, the first end portion being in a crushed condition and projecting into the passageway at the station between the first and second ports, the first end portion of the bladder in the uncrushed condition having an elongated tubular configuration which is closed at the one end and which has a tube wall defining a tube cross-section completely obstructing the fluid passageway at said station, the first end portion in the crushed condition having the tube wall substantially collapsed upon itself whereby the fluid passageway is not fully obstructed between the ports, and the second end portion of the bladder being uncrushed and having a tubular cross section substantially filling the opening in the valve housing.

9. A normally open valve as defined in claim 8 wherein
the metallic bladder in the crushed condition has the collapsed tube wall at said crushed end portion flattened in a planar configuration; and the bladder is mounted in the valve housing with the planar configuration generally aligned with the fluid flow path defined by the fluid passageway and thereby minimizes the resistance to fluid flow.

10. A normally open valve as defined in claim 9 wherein
the metallic bladder in the crushed condition has the tube wall at said first end portion folded inwardly at one side and flattened in a series of convolutions.

11. A normally open valve as defined in claim 8 wherein:
the first end portion of the metallic bladder in the valve housing has the tube wall collapsed upon itself and flattened between said opening in the valve housing and the closed end portion of the tubular configuration.

12. A normally open valve as defined in claim 8 further including
means connected with the second portion of the metallic bladder in the housing for pressurizing the bladder to deform the crushed tube wall to the uncrushed condition obstructing the passageway in the housing.

13. A normally open valve as in claim 12 wherein
the means for pressurizing includes a pyrotechnic squib mounted in sealing relationship in the second end portion of bladder.

14. A normally open valve as defined in claim 8 wherein:
the deformable bladder is mounted in the housing with the crushed end portion located closer to one side of the passageway than the other side.

15. A normally open valve as defined in claim 8 wherein:
the crushed end portion of the metallic bladder has the tube wall folded inwardly at several sides and flattened in a series of convolutions.

16. A normally open valve as defined in claim 8 further including:
sealing means embedded in the valve housing and cooperating with the metallic bladder in the uncrushed condition to achieve a fluid-tight closure of the valve.

17. A normally open valve as defined in claim 8 wherein: the valve housing has a cylindrical extension connecting with the fluid passageway at one end and defining the opening at the other end; and the second end portion of the bladder has a cylindrical cross section fitting coaxially within the cylindrical extension of the housing.

* * * * *